US012574352B2

(12) United States Patent
Song

(10) Patent No.: US 12,574,352 B2
(45) Date of Patent: Mar. 10, 2026

(54) MACHINE LEARNING INFORMATION PROCESSING DEVICE, PROGRAM, AND INFORMATION PROCESSING METHOD

(71) Applicant: CITADEL AI INC., Tokyo (JP)

(72) Inventor: Kenny Yizhou Song, Tokyo (JP)

(73) Assignee: CITADEL AI INC., Tokyo (JP)

( * ) Notice: Subject to any disclaimer, the term of this patent is extended or adjusted under 35 U.S.C. 154(b) by 207 days.

(21) Appl. No.: 18/547,221

(22) PCT Filed: Feb. 25, 2022

(86) PCT No.: PCT/JP2022/007864
§ 371 (c)(1),
(2) Date: Aug. 21, 2023

(87) PCT Pub. No.: WO2022/190899
PCT Pub. Date: Sep. 15, 2022

(65) Prior Publication Data
US 2024/0056422 A1 Feb. 15, 2024

(30) Foreign Application Priority Data
Mar. 11, 2021 (JP) ................................. 2021-039193

(51) Int. Cl.
*H04L 9/40* (2022.01)
*G06N 20/00* (2019.01)

(52) U.S. Cl.
CPC ......... *H04L 63/0245* (2013.01); *G06N 20/00* (2019.01)

(58) Field of Classification Search
CPC . H04L 63/0245; H04L 63/0218; H04L 41/16; H04L 45/08; G06N 20/00;
(Continued)

(56) References Cited

U.S. PATENT DOCUMENTS

| 12,218,910 B2 * | 2/2025 | Alexis | ................. | H04L 63/0218 |
| 2006/0112026 A1 * | 5/2006 | Graf | ....................... | G06N 20/00 |
| | | | | 706/14 |

(Continued)

FOREIGN PATENT DOCUMENTS

| JP | 2019-159669 A | 9/2019 |
| JP | 2020-091656 A | 6/2020 |
| JP | 2020-138296 A | 9/2020 |

OTHER PUBLICATIONS

Extended European Search Report issued on Jul. 17, 2024, in corresponding European Application No. 22766858.9, 10 pages.
(Continued)

*Primary Examiner* — Michael Won
(74) *Attorney, Agent, or Firm* — Maier & Maier, PLLC

(57) ABSTRACT

Invalid data is prevented from being input to a machine-learned information processing device from outside. An information processing device functioning as a firewall for a machine learning server is provided. The information processing device includes an input data check unit and an output data check unit. The input data check unit includes an input data analysis unit and an input data filtering unit. The output data check unit includes an output data analysis unit and an output data filtering unit. The input data analysis unit is configured to analyze input data to be input to the machine learning server. The input data filtering unit is configured to filter out less valid data from the input data. The output data analysis unit is configured to analyze output data outputted from the machine learning server. The output data filtering unit is configured to filter out less valid data from the output data.

9 Claims, 14 Drawing Sheets

(58) Field of Classification Search

CPC ........ G06F 21/55; G06F 7/023; G06F 16/337; G06F 30/27

See application file for complete search history.

(56) References Cited

U.S. PATENT DOCUMENTS

| | | | |
|---|---|---|---|
| 2017/0308802 A1 | 10/2017 | Ramsøy et al. | |
| 2018/0018590 A1* | 1/2018 | Szeto | G16H 10/60 |
| 2019/0273509 A1* | 9/2019 | Elkind | G06N 3/08 |
| 2020/0236143 A1* | 7/2020 | Zou | G06F 21/1078 |
| 2020/0285737 A1* | 9/2020 | Kraus | G06F 21/552 |
| 2021/0089005 A1 | 3/2021 | Ueyama et al. | |
| 2022/0152823 A1 | 5/2022 | Hasunuma et al. | |
| 2022/0253526 A1* | 8/2022 | Sanders | G06N 3/08 |
| 2022/0294217 A1* | 9/2022 | Spalt | G06Q 10/04 |
| 2023/0115046 A1* | 4/2023 | Karta | H04L 63/1483 |
| | | | 726/23 |
| 2023/0262093 A1* | 8/2023 | Gupta | H04L 63/1425 |
| | | | 726/1 |
| 2024/0163253 A1* | 5/2024 | Neystadt | H04L 63/0227 |

OTHER PUBLICATIONS

Laishram et al., "Curie: A method for protecting SVM Classifier from Poisoning Attack", Department of Electrical Engineering and Computer Science, Jun. 7, 2016, 19 pages.

Grosse et al. "On the (Statistical) Detection of Adversarial Examples," Cornell University Library, Feb. 21, 2017, 15 pages.

Cretu et al., "Casting out Demons: Sanitizing Training Data for Anomaly Sensors", 2008 IEEE Symposium on Security and Privacy, May 28, 2008, pp. 81-95.

Diaz-Verdejo et al., "A methodology for conducting efficient sanitization of HTTP training datasets," Future Generation Computer Systems, Mar. 14, 2020, vol. 109, pp. 67-82.

International Search Report issued on Apr. 26, 2022 in corresponding application No. PCT/JP2022/007864; 4 pgs.

Une Masashi et al., "Research trends on vulnerabilities and countermeasures in machine learning system", Proceedings of Computer Security Symposium 2018; Oct. 15, 2018, vol. 2018, No. 2, pp. 193-200, 9 pages.

* cited by examiner

FIG. 4 (TRAINING PHASE)
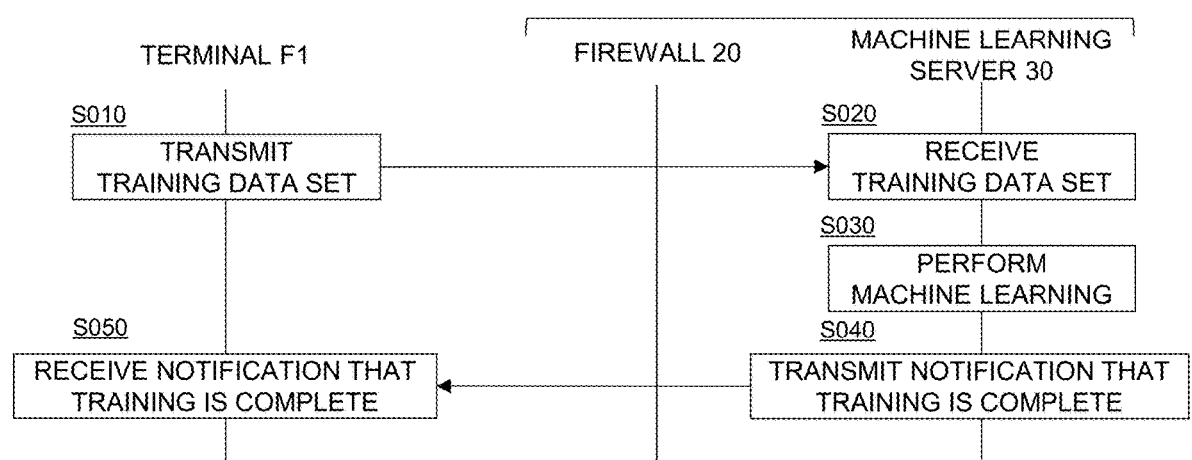

Figure 5:
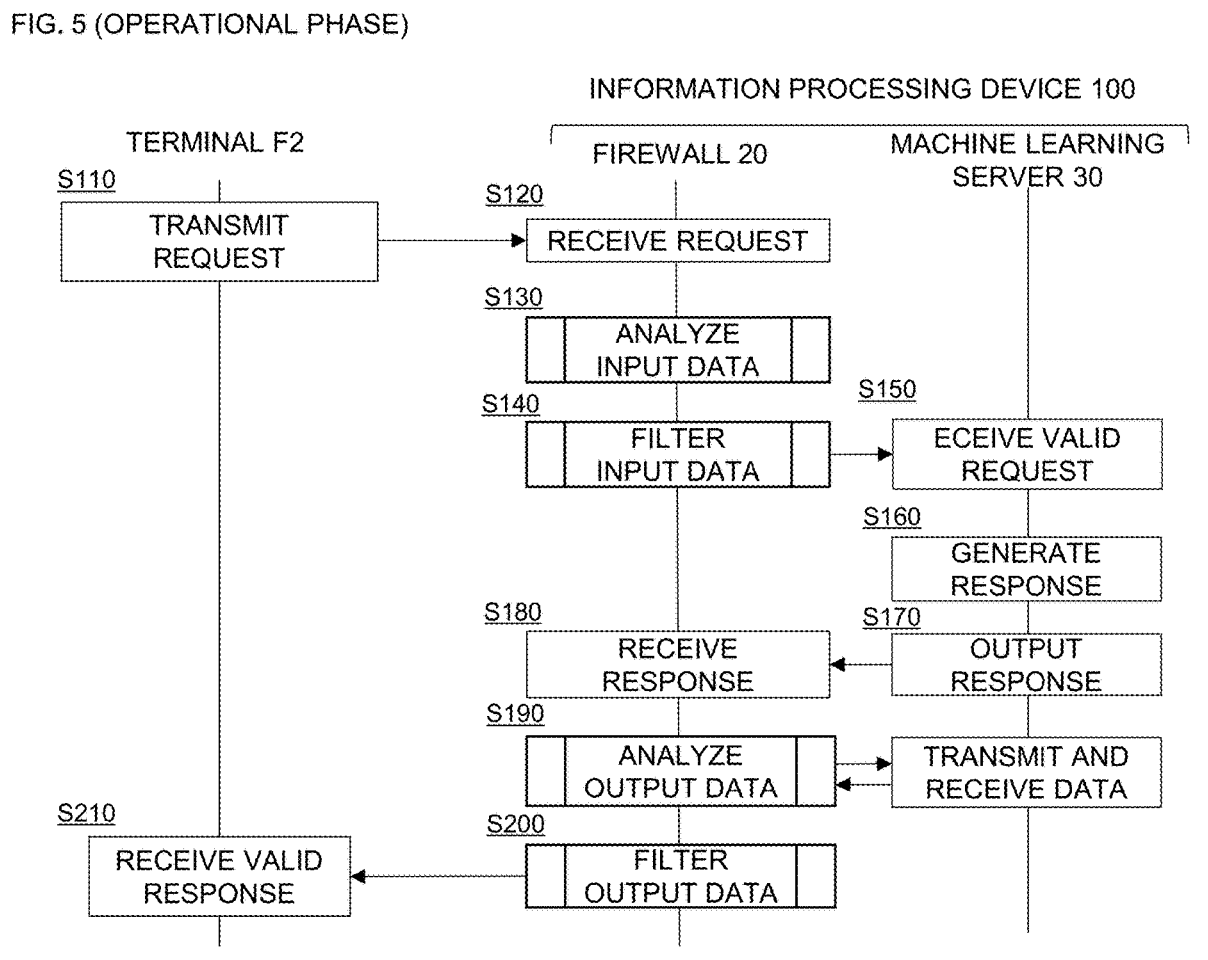

FIG. 5 (OPERATIONAL PHASE)

INFORMATION PROCESSING DEVICE 100

TERMINAL F2

FIREWALL 20

MACHINE LEARNING
SERVER 30

S110
TRANSMIT
REQUEST

S120
RECEIVE REQUEST

S130
ANALYZE
INPUT DATA

S140
FILTER
INPUT DATA

S150
ECEIVE VALID
REQUEST

S160
GENERATE
RESPONSE

S180
RECEIVE
RESPONSE

S170
OUTPUT
RESPONSE

S190
ANALYZE
OUTPUT DATA

TRANSMIT AND
RECEIVE DATA

S210
RECEIVE VALID
RESPONSE

S200
FILTER
OUTPUT DATA

S130: ANALYZE INPUT DATA

START

S131

CALCULATE STATISTICAL
DATA ON REQUESTS

S132

ANALYZE
COMMUNICATION

END

S140: FILTER INPUT DATA

START

S141
EXECUTE UNKNOWN
REQUEST FILTERING

S142
EVALUATE SCHEMA

S143
DETECT MODEL
EXTRACTION ATTACK

S144
OUTPUT VALID REQUEST TO
MACHINE LEARNING
SERVER 30

S145
EXTRACT LESS
VALID DATA

END

S190: ANALYZE OUTPUT DATA

S200: FILTER OUTPUT DATA

START

S201

DETECT ADVERSARIAL INPUT

S202

EXECUTE UNKNOWN
RESPONSE FILTERING

S203

OUTPUT VALID RESPONSE TO
TERMINAL F2

S204

EXTRACT LESS
VALID DATA

END

FIG. 10 (TOP SCREEN)

FIG. 12A

| FEATURE 1 | 0.5 |
|---|---|
| FEATURE 2 | -0.1 |
| FEATURE 3 | 123 |
| FEATURE 4 | 0.01 |

FIG. 12B

| FEATURE 1 | | +0.8 |
|---|---|---|
| FEATURE 2 | -0.7 | |
| FEATURE 3 | | +0.5 |
| FEATURE 4 | -0.2 | |

FIG. 14
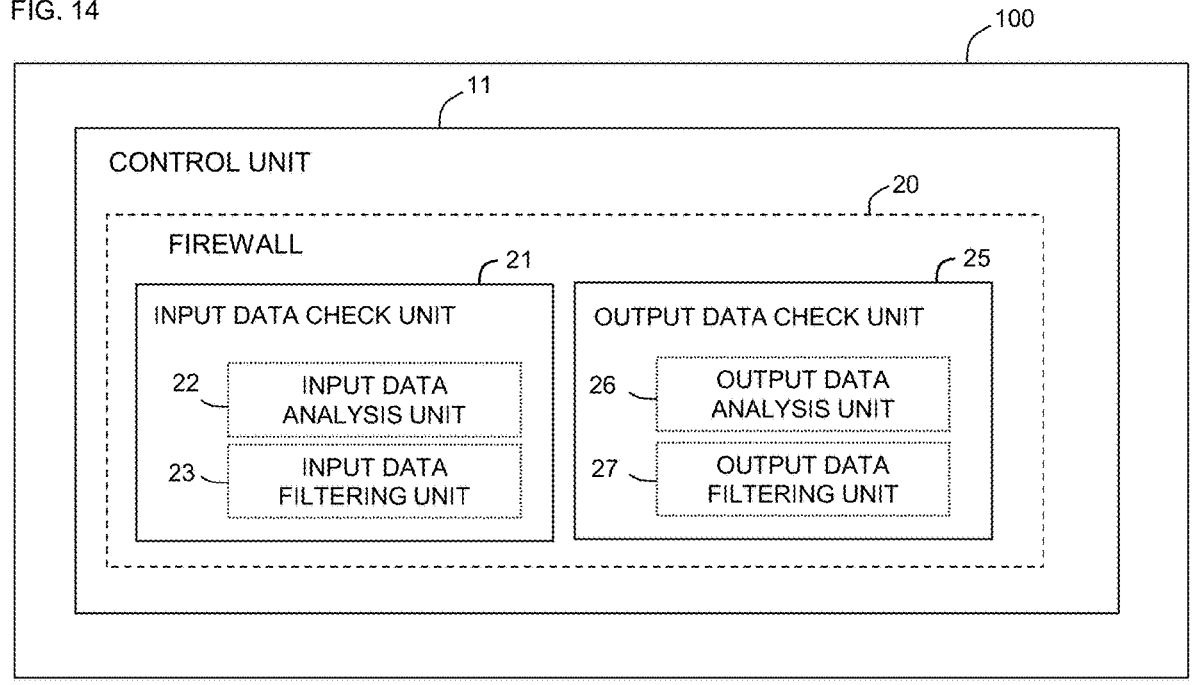
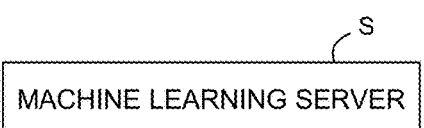

MACHINE LEARNING INFORMATION PROCESSING DEVICE, PROGRAM, AND INFORMATION PROCESSING METHOD

TECHNICAL FIELD

The present invention relates to an information processing device, program, and information processing method.

Technologies for ensuring the security of information processing devices that perform machine learning have been developed in recent years. For example, Patent Literature 1 discloses a machine learning model control system that inquires as to whether a robot controller configured to use a machine learned model is authorized to use the machine-learned model and makes the machine-learned model available when the robot controller is authorized.

CITATION LIST

Patent Literature

[Patent Literature 1] Japanese Unexamined Patent Application Publication No. 2020-138296

SUMMARY OF INVENTION

Technical Problem

However, invalid data may be input to the information processing device including the machine-learned model from outside. The invalid data may be, for example, malicious data for attacking or extracting the machine-learned model. The invalid data may also be error data that has entered due to misoperation of a user. The invalid data may also be data that was suitable as input data when training machine learning but requires some modification due to changes in social conditions or the like when using the machine-learned model. The technology of Patent Literature 1 cannot cope with these cases.

An object of the present invention is to prevent invalid data from being input to a machine-learned information processing device from outside.

Solution to Problem

An information processing device functioning as a firewall for a machine learning server is provided. The information processing device includes an input data check unit and an output data check unit. The input data check unit includes an input data analysis unit and an input data filtering unit. The output data check unit includes an output data analysis unit and an output data filtering unit. The input data analysis unit is configured to analyze input data to be input to the machine learning server. The input data filtering unit is configured to filter out less valid data from the input data. The output data analysis unit is configured to analyze output data outputted from the machine learning server. The output data filtering unit is configured to filter out less valid data from the output data.

These configurations can prevent invalid data from being input from the outside to a machine-learned information processing device.

BRIEF DESCRIPTION OF DRAWINGS

FIG. 4 is a sequence diagram showing the flow of a process performed by the information processing device 100 in a training phase.

FIG. 5 is a sequence diagram showing the flow of a process performed by the information processing device 100 in a operational phase.

FIG. 10 is a diagram showing an example of the top screen of the information processing device 100.

FIG. 12A is a diagram showing an example of a screen indicating a schema evaluation process (step S142).

FIG. 12B is a diagram showing an example of a screen indicating a response reason presenting process (step S191).

FIG. 14 is a block diagram showing the functional components of the information processing device 100 according to the other embodiment.

DESCRIPTION OF EMBODIMENTS

Now, some embodiments of the present invention will be described with reference to the drawings. Various features described in the embodiments below can be combined with each other. Inventions are established for the respective features.

1. First Embodiment

1-1. Information Processing Device 100

Figure 1:
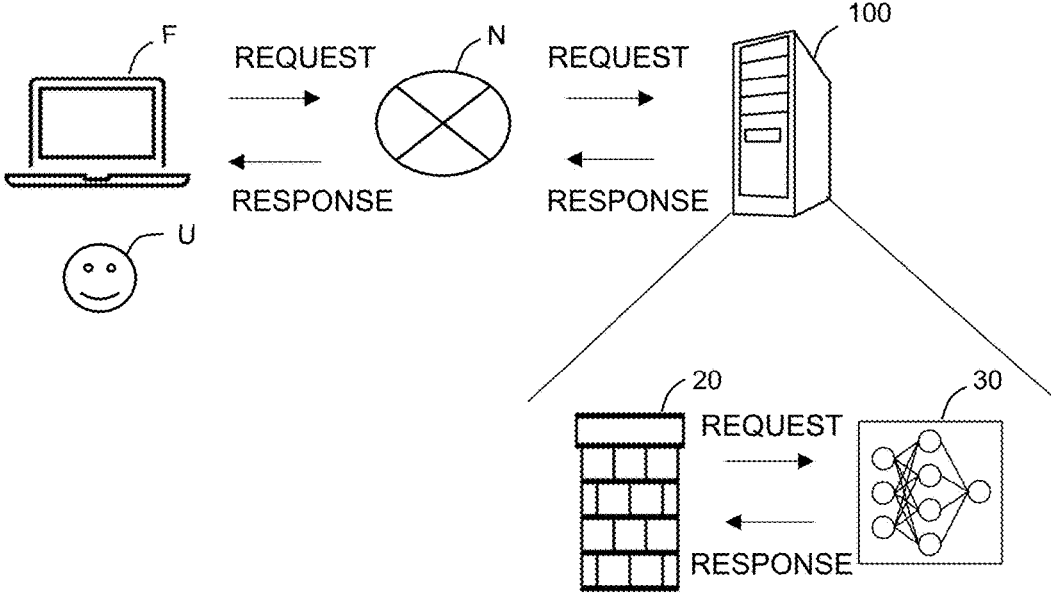
FIG. 1 is a diagram showing an outline of an information processing device 100 according to a first embodiment.

The information processing device 100 according to one embodiment of the present invention provides a machine learning server as shown in FIG. 1. The information processing device 100 includes a firewall 20 and a machine learning server 30.

The information processing device 100 is connected to a network N such as the Internet so as to be able to communicate with an external terminal F. By operating the external terminal F, a user U transmits multiple pieces of training data (hereafter also referred to as a training data set) to the machine learning server 30 so that the machine learning server 30 performs machine learning.

Also, by operating the external terminal F, the user U transmits input data to the machine-learned machine learning server 30 so that the machine learning server 30 generates a response (output data) to the request (input data). Then, the user U receives the response from the machine learning server 30.

The firewall 20 checks whether the request received from the external terminal F and the response generated by the machine learning server 30 are less valid data. If the firewall 20 determines that the request is less valid data, the request is not input to the machine learning server 30 or the firewall 20 raises some alert so that an operator checks the request. Also, if the firewall 20 determines that the response is less valid data, the response is not transmitted to the external terminal F or the firewall 20 raises some alert so that the operator checks the response. The firewall 20 thus configured ensures the security of the machine learning server 30. The functions of the components will be described below in detail.

1-2. Hardware Components of Information Processing Device 100

Figure 2:
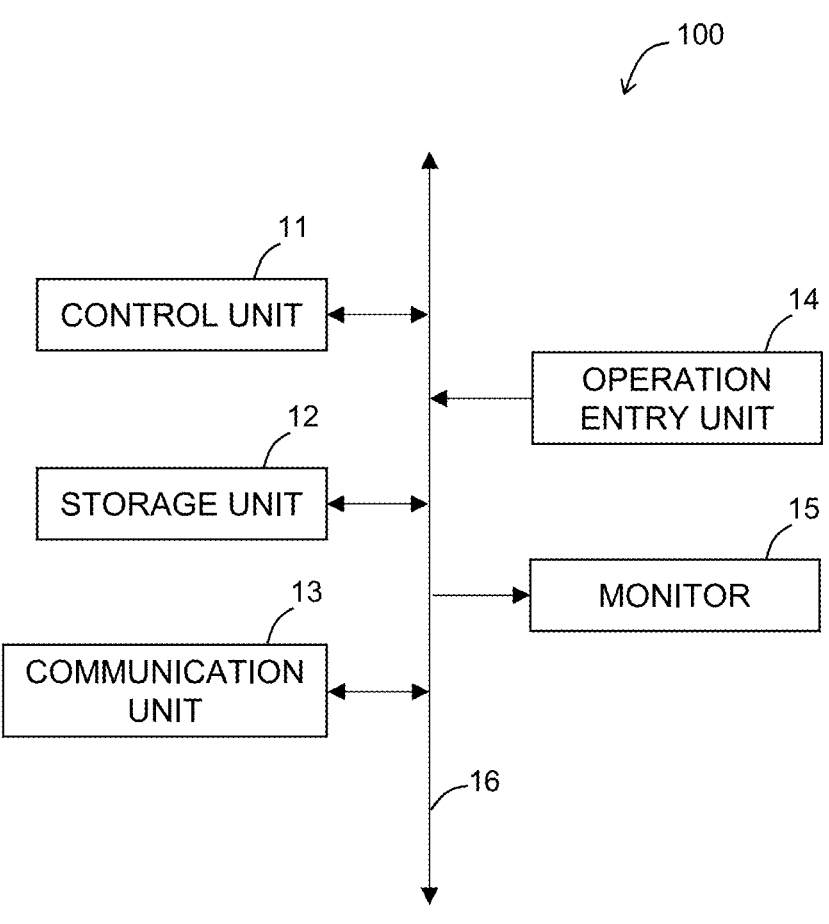
FIG. 2 is a block diagram showing the hardware components of the information processing device 100 according to the first embodiment.

Referring to FIG. 2, the hardware components of the information processing device 100 will be described.

1-2-1. Hardware Components of Information Processing Device 100

FIG. 2 is an example of a block diagram showing the hardware components of the information processing device 100. The information processing device 100 includes a control unit 11, a storage unit 12, and a communication unit 13. The information processing device 100 may include an operation entry unit 14 that includes a keyboard, a mouse, and the like and receives input of operations and a monitor 15 such as a liquid crystal display that displays images.

The control unit 11 is, for example, a central processing unit (CPU), a microprocessor, a digital signal processor (DSP), or the like and controls the overall operation of the information processing device 100.

A part of the storage unit 12 consists of, for example, a random access memory (RAM), a dynamic random access memory (DRAM), or the like and is used as a work area or the like when the control unit 11 performs processing on the basis of a program. Another part of the storage unit 12 is, for example, a nonvolatile memory such as a read-only memory (ROM) or a hard disk drive (HDD) and stores various types of data, programs used by the control unit 11 to perform processing, and the like.

The programs stored in the storage unit 12 are, for example, an operating system (OS) for implementing the basic functions of the information processing device 100, drivers for controlling various types of hardware, programs for implementing various functions, and the like and include a computer program according to the present embodiment.

The communication unit 13 is, for example, a network interface controller (NIC) having a function of connecting the information processing device 100 to the network N. Instead of or in addition to the NIC, the communication unit 13 may have a function of connecting the information processing device 100 to a wireless LAN (local area network) or a function of connecting the information processing device 100 to a wireless WAN (wide area network), or for example, a function of enabling short-range wireless communication, such as Bluetooth®, or infrared communication. The information processing device 100 is connected to other information processing devices and the like, including the external terminal F, through the network N so that it can transmit and receive data to and from the other information processing devices and the like.

The control unit 11, storage unit 12, communication unit 13, operation entry unit 14, and monitor 15 are electrically connected to each other through a system bus 16. Thus, the control unit 11 is able to, for example, access the storage unit 12, display images on the monitor 15, grasp the state of an operation on the operation entry unit 14 performed by the user U, or access communication networks or other information processing devices through the communication unit 13.

1-3. Functional Components of Information Processing Device 100

Figure 3:
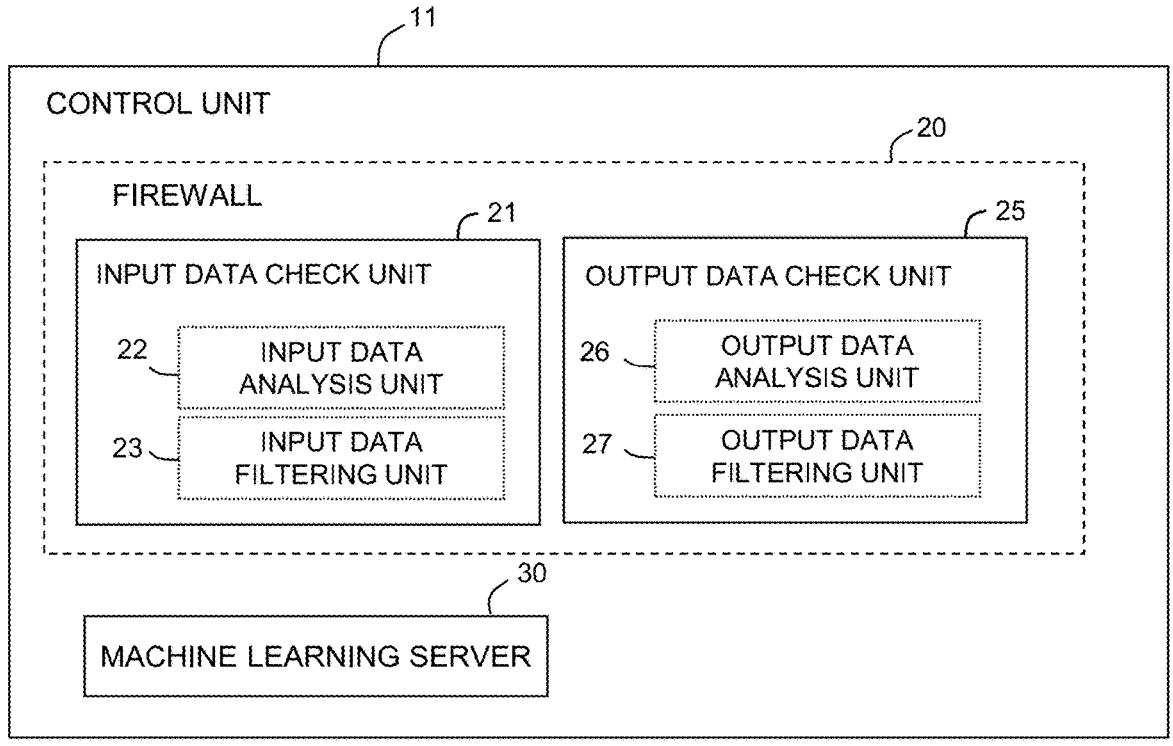
FIG. 3 is a block diagram showing the functional components of the information processing device 100 according to the first embodiment.

As shown in FIG. 3, the control unit 11 of the information processing device 100 includes the firewall 20 and machine learning server 30. The firewall 20 includes an input data check unit 21 and an output data check unit 25.

The input data check unit 21 includes an input data analysis unit 22 and an input data filtering unit 23. The input data analysis unit 22 analyzes a request to be input to the machine learning server 30. The input data filtering unit 23 filters out less valid data from the request.

The output data check unit 25 includes an output data analysis unit 26 and an output data filtering unit 27. The output data analysis unit 26 analyzes a response outputted from the machine learning server 30. The output data filtering unit 27 filters out less valid data from the response. Details of the functions of the respective components will be described later.

The above functional components may be implemented by software (application) installed to the information processing device 100 as necessary, or may be implemented by hardware. In the case of software, the functions are implemented when the control unit 11 executes a program constituting the software.

The program may be stored in the storage unit 12 included in the information processing device 100 or a computer-readable, non-transitory storage medium. Or, the functional components may be realized by so-called "cloud computing", in which the program stored in an external storage device is loaded. In the case of hardware, the functions can be implemented by various types of circuits, such as ASIC, SOC, FPGA, and DRP.

1-4. Flow of Process Performed by Information Processing Device 100

Referring to FIGS. 4 and 5, the flow of a process performed by the information processing device 100 will be described. FIG. 4 shows the flow of a process in which the machine learning server 30 performs training (hereafter also referred to as the training phase).

As shown in FIG. 4, in step S010, an operator who performs machine learning transmits a training data set from a terminal F1 to the information processing device 100. In step S020, the machine learning server 30 receives the training data set.

In step S030, the machine learning server 30 generates a learned model by performing machine learning using the received training data set. While, in the present embodiment, it is assumed that supervised data learning is performed, it is not limited to this form of learning. In step S040, the machine learning server 30 transmits a notification that the learning is complete to the terminal F1. In step S050, the terminal F1 receives the notification that the learning is complete. Information on the training data set used in the machine learning is stored in the storage unit 12 as history information.

FIG. 5 shows the flow of a process in which the machine learning server 30 provides a service (hereafter also referred to as the operational phase).

As shown in FIG. 5, in step S110, a user who uses the machine learning server transmits a request from a terminal F2 to the information processing device 100. In step S120, the firewall 20 receives the request. Information on requests received by the firewall 20 is stored in the storage unit 12 as history information.

In step S130, the firewall 20 performs an input data analysis process on the received request. In step S140, the firewall 20 performs an input data filtering process.

In step S150, the machine learning server 30 receives the valid request. In step S160, the machine learning server 30 generates a response to the request. In step S170, the machine learning server 30 outputs the response to the firewall 20.

In step S180, the firewall 20 receives the response. In step S190, the firewall 20 performs an output data analysis process on the received response. In step S200, the firewall 20 performs an output data filtering process. In step S210, the terminal F2 receives the valid response.

Figure 6:
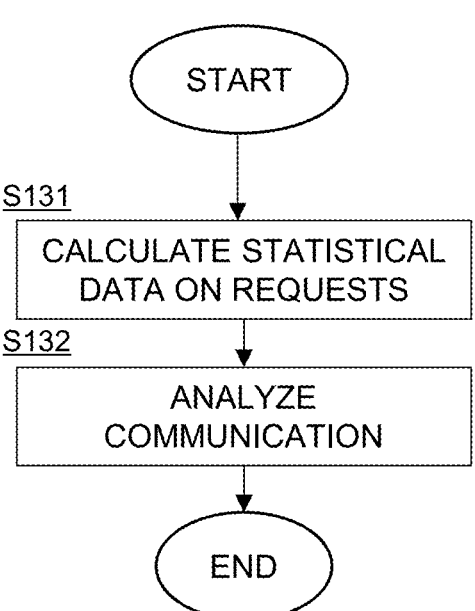
FIG. 6 is a flow diagram showing the flow of an input data analysis process (step S130).

Referring to FIG. 6, the input data analysis process (step S130) will be described. In the input data analysis process, the input data analysis unit 22 analyzes the request on the basis of information on the history of requests and information on the history of training data sets stored in the storage unit 12. When necessary, the input data analysis unit 22 may calculate statistical data on the history of requests and/or training data sets (data included in "information on a history" in the claims) and use the statistical data in the analysis process.

In step S131, the input data analysis unit 22 executes the statistical analysis of the received request. Specifically, the input data analysis unit 22 calculates a statistical value such as the average value or variance value of the request.

In step S132, the input data analysis unit 22 analyzes the amount of communication. For example, the input data analysis unit 22 analyzes the amount of information of the request and the region from which the request has been transmitted. The input data analysis unit 22 may analyze information on the terminal that has transmitted the request, information on the operating system (OS) of the terminal that has transmitted the request, or information on the browser of the terminal that has transmitted the request.

Figure 7:
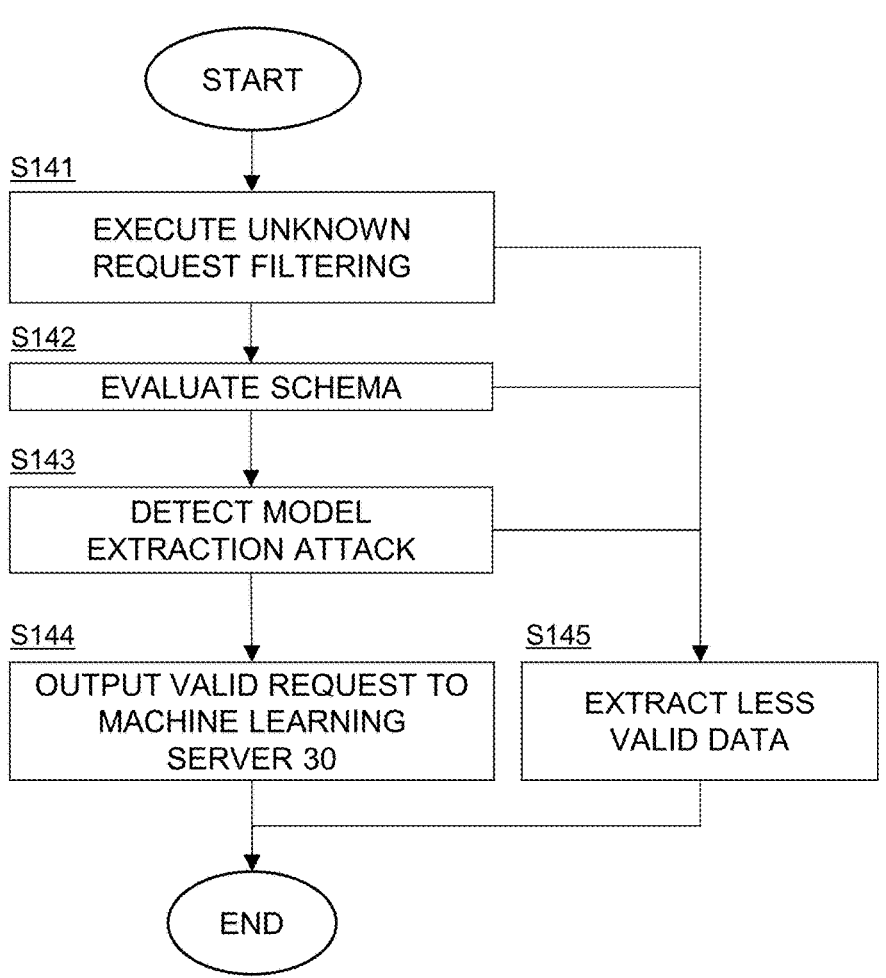
FIG. 7 is a flow diagram showing the flow of an input data filtering process (step S140).

Referring to FIG. 7, the input data filtering process (step S140) will be described. In the input data filtering process, the input data filtering unit 23 executes request filtering, on the basis of the information on the history of training data sets stored in the storage unit 12. When necessary, the input data filtering unit 23 may calculate statistical data on the history of training data sets and use the statistical data in the filtering process.

In step S141, the input data filtering unit 23 executes unknown request filtering. The input data filtering unit 23 compares the request with the information on the history of training data sets in the training phase and evaluates the deviation of the request from the distribution of the training data sets. If the deviation from the distribution exceeds a predetermined threshold, the input data filtering unit 23 determines that the request is less valid input data and performs step S145.

In step S142, the input data filtering unit 23 evaluates the schema. Specifically, the input data filtering unit 23 evaluates the attribute value of the request on the basis of the information on the history of training data sets. If the attribute value exceeds a predetermined threshold, the input data filtering unit 23 determines that the request is less valid input data and performs step S145.

In step S143, the input data filtering unit 23 detects a model extraction attack. If it determines that the request is a model extraction attack, on the basis of the frequency of data input, the distribution of data, or the like, the input data filtering unit 23 determines that the request is less valid input data and performs step S145.

If it determines that the request is valid, the input data filtering unit 23 outputs the request to the machine learning server 30 in step S144.

Figure 8:
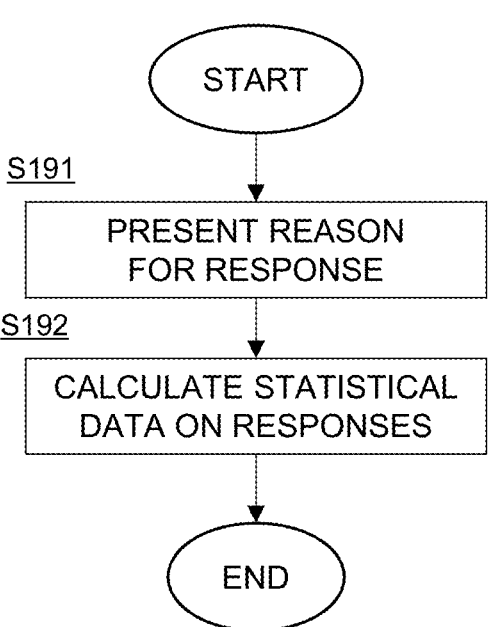
FIG. 8 is a flow diagram showing the flow of an output data analysis process (step S190).

Referring to FIG. 8, the output data analysis process (step S190) will be described. In the output data analysis process, the output data analysis unit 26 analyzes the response generated by the machine learning server 30 on the basis of the request transmitted by the terminal F2 and the response. When necessary, the output data analysis unit 26 may acquire information on past training data sets, a request, a response from the machine learning server to a request newly generated by the firewall, and the history of those, calculate statistical data from the acquired information, and use the statistical data in the filtering process.

In step S191, the output data analysis unit 26 presents the reason for the response. Specifically, the output data analysis unit 26 presents the reason why the response has been generated by evaluating the degree of contribution of each feature in the generation of the response.

In step S192, the output data analysis unit 26 calculates statistical data on the response. Specifically, the output data analysis unit 26 calculates a statistical value such as the average value or variance value of the response.

Figure 9:
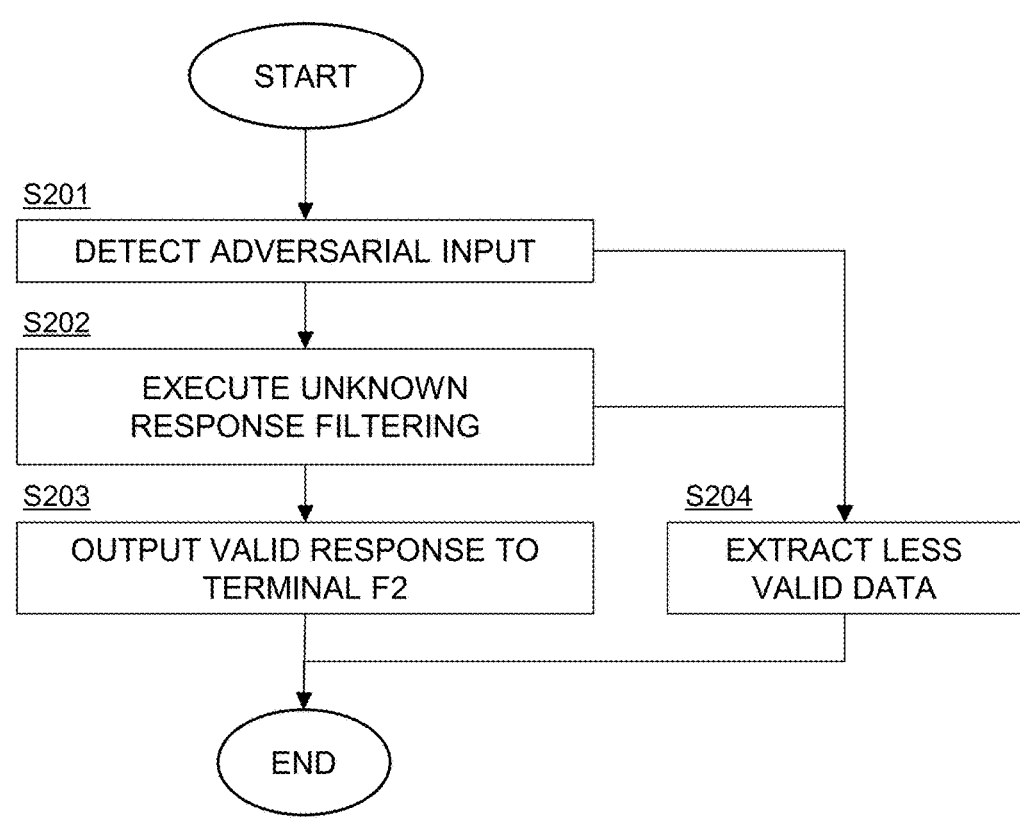
FIG. 9 is a flow diagram showing the flow of an output data filtering process (step S200).

Referring to FIG. 9, the output data filtering process (step S200) will be described. In the output data filtering process, the output data filtering unit 27 executes filtering of the request and response. When necessary, the output data filtering unit 27 may calculate statistical data on the history of requests and/or training data sets and use the statistical data in the filtering process.

In step S201, the output data filtering unit 27 detects an adversarial input. As used herein, the term "adversarial input" refers to a malicious input for intentionally confusing a machine-learned model. If it determines that the request is an adversarial input, the output data filtering unit 27 determines that the response is less valid data and performs step S204.

In step S202, the output data filtering unit 27 executes filtering of the unknown response. Specifically, the output data filtering unit 27 compares the response with the information on the history of training data sets in the training phase and evaluates the deviation of the response from the distribution of the training data sets. If the deviation from the distribution exceeds a predetermined threshold, the output data filtering unit 27 determines that the response is less valid data and performs step S204.

If it determines that the response is valid data, the output data filtering unit 27 outputs the valid response to the terminal F2 in step S203. In step S204, the output data filtering unit 27 extracts the less valid data.

As described above, the information processing device 100 according to the present embodiment checks the validity of the input to and output from the machine learning server model. Thus, it is able to cope with the risk specific to the machine learning server, as well as to visualize the process in which data is input to and outputted from the machine learning server and to secure the quality and reliability of the machine learning model generated through training. Moreover, the information processing device 100 is able to visualize the determination criteria for input and output data to and from the machine learning server.

1-5. Example Screens

Referring to FIGS. 10 to 12, example screens indicating some of processes performed by the information processing device 100 described above will be described. Note that the screens described below are only illustrative and are not limited to those forms.

FIG. 10 is a diagram showing an example of the top screen of the information processing device 100. The statuses of machine learning servers, servers 1 to 3, connected to the information processing device 100 are shown in status check areas D1 to D3 of FIG. 10. One of "normal", "check required", and "abnormal" is shown in status icons S1 to S3. The operator of the information processing device 100 is able to check details of data input to and outputted from a machine learning server indicating "check required" or "abnormal."

Figure 11A:
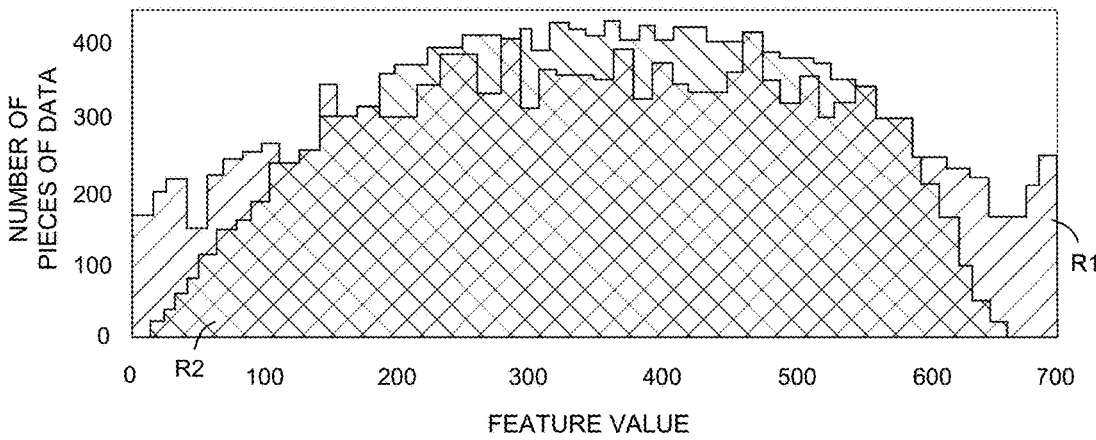
FIG. 11A is a graph showing an example of a screen indicating a statistical analysis of requests (step S131).

FIG. 11A is a graph showing an example of a screen indicating a statistical analysis of requests (step S131). FIG. 11A shows the distribution of training data as a region R1 (that is, the number of pieces of data for each feature value) and the distribution of requests as a region R2. The operator is able to check whether the request does not deviate from the training data and to evaluate the validity by making a comparison between the regions R1 and R2.

Figure 11B:
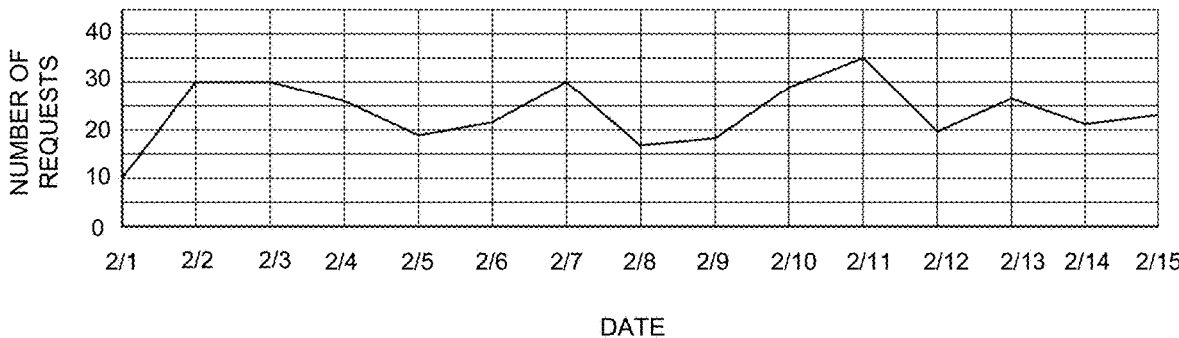
FIG. 11B is a graph showing an example of a screen indicating a communication analysis process (step S132).

FIG. 11B is a graph showing an example of a screen indicating a communication analysis process (step S132). FIG. 11B shows daily changes in the number of requests. By checking daily changes in the number of requests, the operator is able to detect an extreme decrease or increase in the number of requests and to determine the validity of the request.

FIG. 12A is a diagram showing an example of a screen indicating a schema evaluation process (step S142). The operator is able to check values for each feature included in the request on the screen shown in FIG. 12A. A threshold may be previously set for each feature so that an error message (or alert) is raised when any feature exceeds the corresponding threshold. For example, a message indicating that "the value of feature 2 is −0.1 and falls outside 0 to 1, which is the range of the expected value" may be raised.

FIG. 12B is a diagram showing an example of a screen indicating a response reason presenting process (step S191). FIG. 12B shows the weighting factors of the features in the calculation of the response. By checking these weighting factors, the operator is able to evaluate the validity of the response.

2. Other Embodiments

While the embodiment of the present invention and the modifications thereof have been described above, the application of the present disclosure is not limited to those described above.

For example, specific details of the input data analysis process (step S130), input data filtering process (step S140), output data analysis process (step S190), and output data filtering process (step S200) performed by the firewall 20 are not limited to those in the above embodiment. When necessary, the operator may add a process of checking the validity of the request or response using a proprietary algorithm or an existing algorithm, or may change the process according to the above embodiment to such a process.

While, in the above embodiment, the input data analysis process, input data filtering process, output data analysis process, and output data filtering process are sequentially performed, these processes are not limited to this form. For example, the input data analysis process and input data filtering process may be performed in parallel, and the output data analysis process and output data filtering process may be performed in parallel. In this case, it is preferable to use the results of the input data analysis process in the input data filtering process and to use the results of the output data analysis process in the output data filtering process.

Figure 13:
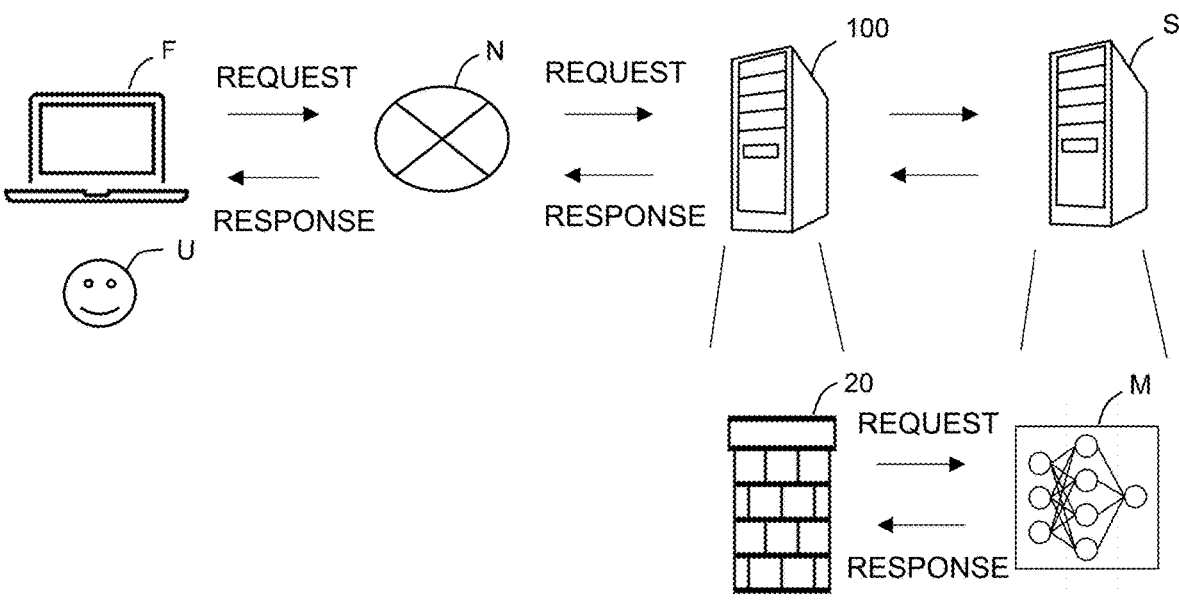
FIG. 13 is a diagram showing an outline of an information processing device 100 according to another embodiment.

While, in the above embodiment, the information processing device 100 has been described as including the above functions, some functions may be implemented in another information processing device. For example, as shown in FIGS. 13 and 14, the firewall 20 and machine learning server 30 may be implemented in different information processing devices, and the information processing devices may be communicatively connected to each other by wire or wirelessly so that they function as substantially one information processing device.

While, in the above embodiment, the external terminal F and information processing device 100 are connected to the network N such as the Internet, the network N may be any wide area network (WAN) or local area network (LAN) rather than the Internet. For example, the external terminal F and information processing device 100 may be directly connected to each other through a LAN cable.

The invention of the present application may be implemented using an implementation method different from that of the above embodiment. For example, the present invention may be implemented in a smartphone, a wearable terminal such as a smart watch, a car navigation system, a car-mounted autonomous driving system, or the like using a silicon chip.

The present invention may be embodied as a program for implementing the functions of the firewall 20.

The present invention may also be embodied as a computer-readable, non-transitory storage medium storing the above program.

While the various embodiments according to the present invention have been described above, the embodiments are only illustrative and are not intended to limit the scope of the invention. These novel embodiments can be carried out in other various forms, and various omissions, replacements, or changes can be made thereto without departing from the spirit of the invention. The embodiments and modifications thereof are included in the spirit and scope of the present invention, as well as included in the scope of the invention set forth in the claims and equivalents thereof.

DESCRIPTION OF REFERENCE SIGNS

11: control unit, 12: storage unit, 13: communication unit, 14: operation entry unit, 15: monitor, 16: system bus, 20: firewall, 21: input data check unit, 22: input data analysis unit, 23: input data filtering unit, 25: output data check unit, 26: output data analysis unit, 27: output data filtering unit, 30: machine learning server, 100: information processing device

The invention claimed is:

1. A firewall functioning as a firewall for a machine learning server, comprising:

an input data check unit; and an output data check unit, wherein the machine learning server includes a learned model that has been pre-generated in a training phase in which machine learning is performed using the training data set to generate the learned model, wherein the input data check unit comprises:

an input data analysis unit; and an input data filtering unit, wherein the output data check unit comprises:

an output data analysis unit; and an output data filtering unit, wherein the input data analysis unit is configured to analyze input data from a user to be input to the machine learning server by executing a statistical analysis of the input data in an operational phase in which an output of the learned model for the input data is provided to the user after the training phase, wherein the input data filtering unit is configured to filter out less valid data from the input data based on comparing the input data with the information on the history of training data sets in the training phase and evaluating the deviation of the input data from the distribution of the training data sets and/or detecting model extraction attacks in the operational phase, wherein the output data analysis unit is configured to analyze output data outputted from the learned model by executing a statistical analysis of the output data in the operational phase, and wherein the output data filtering unit is configured to filter out less valid data from the output data based on comparing the output data with the information on the history of training data sets in the training phase and evaluating the deviation of the output data from the distribution of the training data sets and/or detecting adversarial input in the operational phase.

2. The firewall of claim 1, wherein the output data analysis unit is configured to analyze the output data on the basis of the input data and the output data.

3. The firewall of claim 1, wherein the output data filtering unit is configured to filter out less valid data from the output data, on the basis of the input data and the output data.

4. The firewall of claim 1, further comprising a storage unit, wherein the storage unit is configured to store information on history of training data that is data input to the machine learning server for learning, and wherein the input data filtering unit is configured to execute filtering the input data, further on the basis of the information on the history of the training data.

5. The firewall of claim 1, further comprising a storage unit, wherein the storage unit is configured to store information on history of training data that is data input to the machine learning server for learning, and wherein the output data filtering unit is configured to execute filtering the output data, further on the basis of the information on the history of the training data.

6. The firewall of claim 4, wherein the storage unit is configured to further store information on history of input data, and wherein the input data analysis unit is configured to analyze the input data on the basis of the information on the history of the input data and the information on the history of the training data.

7. The firewall of claim 4, wherein the storage unit is configured to further store information on the history of input data, and wherein the output data analysis unit is configured to analyze the output data, further on the basis of the information on the history of the input data and the information on the history of the training data.

8. A program stored in a non-transitory memory for causing a computer to function as a firewall for a machine learning server, the program causing the computer to perform an input data check step and an output data check step, the machine learning server including a learned model that has been pre-generated in a training phase in which machine learning is performed using the training data set to generate the learned model, the input data check step including an input data analysis step and an input data filtering step, the output data check step including an output data analysis step and an output data filtering step, wherein the input data analysis step comprises analyzing input data from a user to be input to the machine learning server by executing a statistical analysis of the input data in an operational phase in which an output of the learned model for the input data is provided to the user after the training phase, wherein the input data filtering step comprises filtering out less valid data from the input data based on comparing the input data with the information on the history of training data sets in the training phase and evaluating the deviation of the input data from the distribution of the training data sets and/or detecting model extraction attacks in the operational phase, wherein the output data analysis step comprises analyzing output data outputted from the learned model by executing a statistical analysis of the output data in the operational phase, and wherein the output data filtering step comprises filtering out less valid data from the output data based on comparing the output data with the information on the history of training data sets in the training phase and evaluating the deviation of the output data from the distribution of the training data sets and/or detecting adversarial input in the operational phase.

9. An information processing method for causing a computer to function as a firewall for a machine learning server, the information processing method comprising performing, by the computer, an input data check step and an output data check step, the machine learning server including a learned model that has been pre-generated in a training phase in which machine learning is performed using the training data set to generate the learned model, the input data check step including an input data analysis step and an input data filtering step, the output data check step including an output data analysis step and an output data filtering step, wherein the input data analysis step comprises analyzing input data from a user to be input to the machine learning server by executing a statistical analysis of the input data in an operational phase in which an output of the learned model for the input data is provided to the user after the training phase, wherein the input data filtering step comprises filtering out less valid data from the input data based on comparing the input data with the information on the history of training data sets in the training phase and evaluating the deviation of the input data from the distribution of the training data sets and/or detecting model extraction attacks in the operational phase, wherein the output data analysis step comprises analyzing output data outputted from the learned model by executing a statistical analysis of the output data in the operational phase, and wherein the output data filtering step comprises filtering out less valid data from the output data based on comparing the output data with the information on the history of training data sets in the training phase and evaluating the deviation of the output data from the distribution of the training data sets and/or detecting adversarial input in the operational phase.

* * * * *